(12) United States Patent
Chou

(10) Patent No.: US 12,205,425 B2
(45) Date of Patent: Jan. 21, 2025

(54) SYSTEM OF ISSUING A WIRELESS KEY FOR RESERVATION

(71) Applicant: Shih-Kang Chou, Taipei (TW)

(72) Inventor: Shih-Kang Chou, Taipei (TW)

( * ) Notice: Subject to any disclaimer, the term of this patent is extended or adjusted under 35 U.S.C. 154(b) by 141 days.

(21) Appl. No.: 17/959,403

(22) Filed: Oct. 4, 2022

(65) Prior Publication Data

US 2023/0024957 A1    Jan. 26, 2023

Related U.S. Application Data

(63) Continuation-in-part of application No. 16/810,104, filed on Mar. 5, 2020, now abandoned.

(30) Foreign Application Priority Data

Jun. 11, 2019 (TW) ................... 108120063

(51) Int. Cl.
*G07C 9/00* (2020.01)
*G06Q 10/02* (2012.01)

(52) U.S. Cl.
CPC ......... *G07C 9/00904* (2013.01); *G06Q 10/02* (2013.01); *G07C 2009/00769* (2013.01)

(58) Field of Classification Search
CPC .... G06Q 10/02; G06Q 50/12; G07C 9/00904; G07C 9/00817; G07C 9/00714; G07C 9/00309; G07C 2009/00769; G07C 9/00174

See application file for complete search history.

(56) References Cited

U.S. PATENT DOCUMENTS

| | | | |
|---|---|---|---|
| 7,315,823 B2* | 1/2008 | Brondrup | G07C 9/00904 705/5 |
| 9,965,911 B2* | 5/2018 | Wishne | G07C 9/00904 |
| 2001/0016825 A1 | 8/2001 | Pugliese, III et al. | |
| 2003/0208386 A1* | 11/2003 | Brondrup | G07C 9/00904 705/5 |
| 2004/0003257 A1* | 1/2004 | Mitchell | G07C 9/00904 713/182 |
| 2007/0176739 A1* | 8/2007 | Raheman | G07C 9/00904 713/176 |
| 2008/0191009 A1* | 8/2008 | Gressel | H04W 4/021 235/382 |
| 2008/0238669 A1* | 10/2008 | Linford | G08B 13/08 340/542 |
| 2009/0299777 A1 | 12/2009 | Silberman | |
| 2011/0128121 A1 | 6/2011 | Shachar et al. | |
| 2013/0043973 A1 | 2/2013 | Greisen et al. | |

(Continued)

FOREIGN PATENT DOCUMENTS

TW    201608511 A    3/2016

*Primary Examiner* — Daniel I Walsh
(74) *Attorney, Agent, or Firm* — Best & Flanagan LLP

(57) ABSTRACT

A system of issuing a wireless key for reservation has a reservation website providing a reservation voucher to the user immediately when the booking is completed, and a hotel server receiving and verifying the reservation voucher through an access point set in the hotel when the user enters a sensing range of the access point, and issuing an electronic key and a detecting software after the reservation voucher is verified. Then one of the electronic locks of the rooms can be unlock and upgrade by detecting the electronic key and the detecting software.

10 Claims, 3 Drawing Sheets

(56) References Cited

U.S. PATENT DOCUMENTS

| | | | |
|---|---|---|---|
| 2013/0059603 A1* | 3/2013 | Guenec | G07C 9/00571 |
| | | | 455/456.2 |
| 2015/0170448 A1* | 6/2015 | Robfogel | G07C 9/20 |
| | | | 340/5.61 |
| 2015/0199863 A1* | 7/2015 | Scoggins | G07C 9/28 |
| | | | 340/5.25 |
| 2016/0232728 A1* | 8/2016 | Allibhoy | G07C 9/00309 |
| 2016/0249159 A1* | 8/2016 | Berg | H04W 12/04 |
| 2016/0300411 A1 | 10/2016 | Isaacson | |
| 2017/0311161 A1* | 10/2017 | Kuenzi | G07C 9/00904 |
| 2018/0061155 A1* | 3/2018 | Ghorpade | G07C 9/00571 |
| 2018/0146374 A1* | 5/2018 | Golan | G06Q 20/127 |
| 2019/0035185 A1 | 1/2019 | Kuenzi | |
| 2019/0110158 A1* | 4/2019 | Schwartz | H04W 4/021 |
| 2019/0251768 A1* | 8/2019 | Lakamraju | H04W 12/069 |
| 2019/0295195 A1* | 9/2019 | Roosli | G06Q 10/02 |
| 2019/0311303 A1* | 10/2019 | Kanteti | G06Q 10/1095 |
| 2020/0349786 A1* | 11/2020 | Ho | G06V 40/172 |
| 2020/0394573 A1* | 12/2020 | Chou | G07C 9/00904 |
| 2021/0054653 A1* | 2/2021 | Bloom | G07C 9/00563 |
| 2021/0173368 A1* | 6/2021 | Bauer | G07C 9/20 |
| 2021/0319639 A1* | 10/2021 | Ho | G06F 21/31 |
| 2023/0107590 A1* | 4/2023 | Kreiner | G07C 9/23 |
| | | | 345/633 |
| 2023/0206301 A1* | 6/2023 | Endo | G06Q 30/0631 |
| | | | 705/5 |
| 2023/0316160 A1* | 10/2023 | Yamaguchi | G06F 21/32 |
| | | | 705/5 |
| 2023/0385714 A1* | 11/2023 | Desai | G06Q 10/02 |

\* cited by examiner

SYSTEM OF ISSUING A WIRELESS KEY FOR RESERVATION

The present invention is a continuation-in-part, CIP of the application with application Ser. No. 16/810,104.

FIELD OF INVENTION

The present invention relates to a system for assisting room reservation and check-in, especially to a system of issuing a wireless key for reservation.

BACKGROUND OF THE INVENTION

Before or during a travel, booking a room of a hotel from the internet is a most common way to make a reservation. However, after arriving the hotel, passengers cannot enter the room which he/she already book immediately, but need to check-in at the front desk first, wait all the check-in procedure be finished, then get the key, and open the corresponding room.

For the hotel, the purpose of setting the front desk is to control the situations of the reservation and check-in effectively. A system of sending an electronic key to the passengers directly when the booking is completed can be seen in existing technology to maintain the privacy, security, and the mobility of the arrangement of the room. However, the application of the system mentioned above is still not popular, and most of the current hotels still use manpower to execute the check-in procedure and issue the key.

SUMMARY OF THE INVENTION

In order to maintain the privacy, security, and the mobility of the arrangement of the hotel, to achieve effective reduction of the labor costs and overcome the time-wasting check-in procedures at the front desk. The present invention provides a system of issuing a wireless key for reservation, the system comprising:

a server settled a reservation website, and a hotel settled a hotel server Which is connecting and exchanging an information to the reservation website through the internet, the reservation website showing one of rooms/room types which is allowed to accept a reservation in the hotel, the hotel having an access point connected to the hotel server through wired/wireless signal connection, and each room of the hotel having an electronic lock corresponded to the room, wherein a user books one of the rooms/room types of the hotel on the reservation website, the reservation website forms a reservation voucher and an order after receiving the booking from user, wherein the reservation website sends the reservation voucher to a mobile device of the user, and sends the order to the hotel server, the hotel server receives the order and executes a check-in procedure through the order, and when the user carrying the mobile device enters a sensing range, the mobile device exchanges the information with the access point, and sending the reservation voucher to the hotel server though the access point, the hotel server issues an electronic key and a detecting software to the mobile device according to the reservation voucher, wherein the electronic key is applied to unlock one of the electronic locks of the rooms, and the detecting software is applied to detect and upgrade the function of the electronic lock.

The benefit for the user with the process of verifying the reservation voucher is that the hotel server is already assisted the user to complete the check-in procedure after booking. And the user A only needs to connect to the access point via the reservation app, and exchange the electronic key corresponded to one of the rooms by verifying the reservation voucher, then store the electronic key in to the reservation app. It can prevent the user from checking-in, confirming the identity or other procedures at the front desk, completely save the time on check-in procedure, and overcome the problem of not being able to enter the room immediately.

The advantage of verifying the reservation voucher for the hotel and the hotel server is that the hotel only needs to verify the reservation voucher but not re-confirm the identity information of the user. And the hotel can directly transmit the electronic key corresponded to the electronic lock of the hotel room to the user A after verifying the reservation voucher. Not only can help hotel to make sure if the user is arrived, but also can maintain the security with the method of issuing the electronic key after verifying the reservation voucher.

The present invention further provides the hotel can update or detect its peripheral devices while the user unlocking the electronic lock that enables the hotel to reduce labor costs effectively and achieve irregular monitoring. And the system also can develop a novel usage of generates a service as a booking agent while maintaining the security for the hotel.

DETAILED DESCRIPTION OF THE PREFERRED EMBODIMENTS

In order to make purposes, technical solutions, and advantages of the present invention to be dearer, the following content provides some preferred embodiments in accordance with the present invention.

Figure 1:
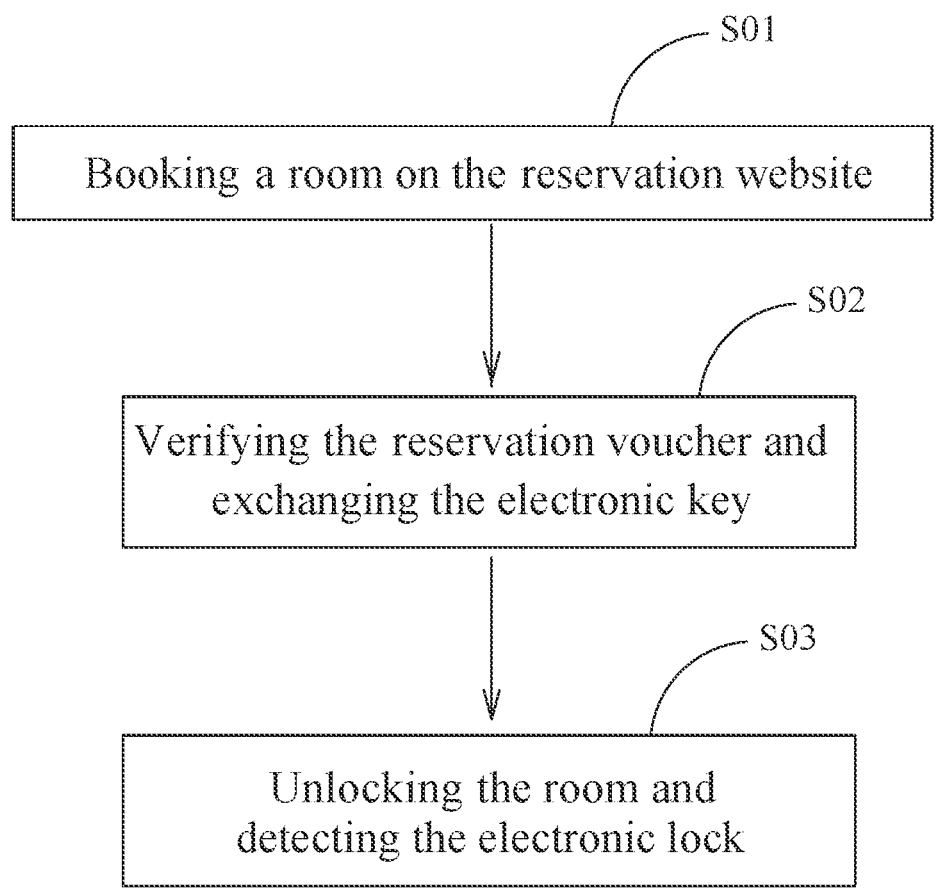
FIG. 1 is a block diagram of a preferred embodiment of a system in accordance with the present invention.
Figure 2:
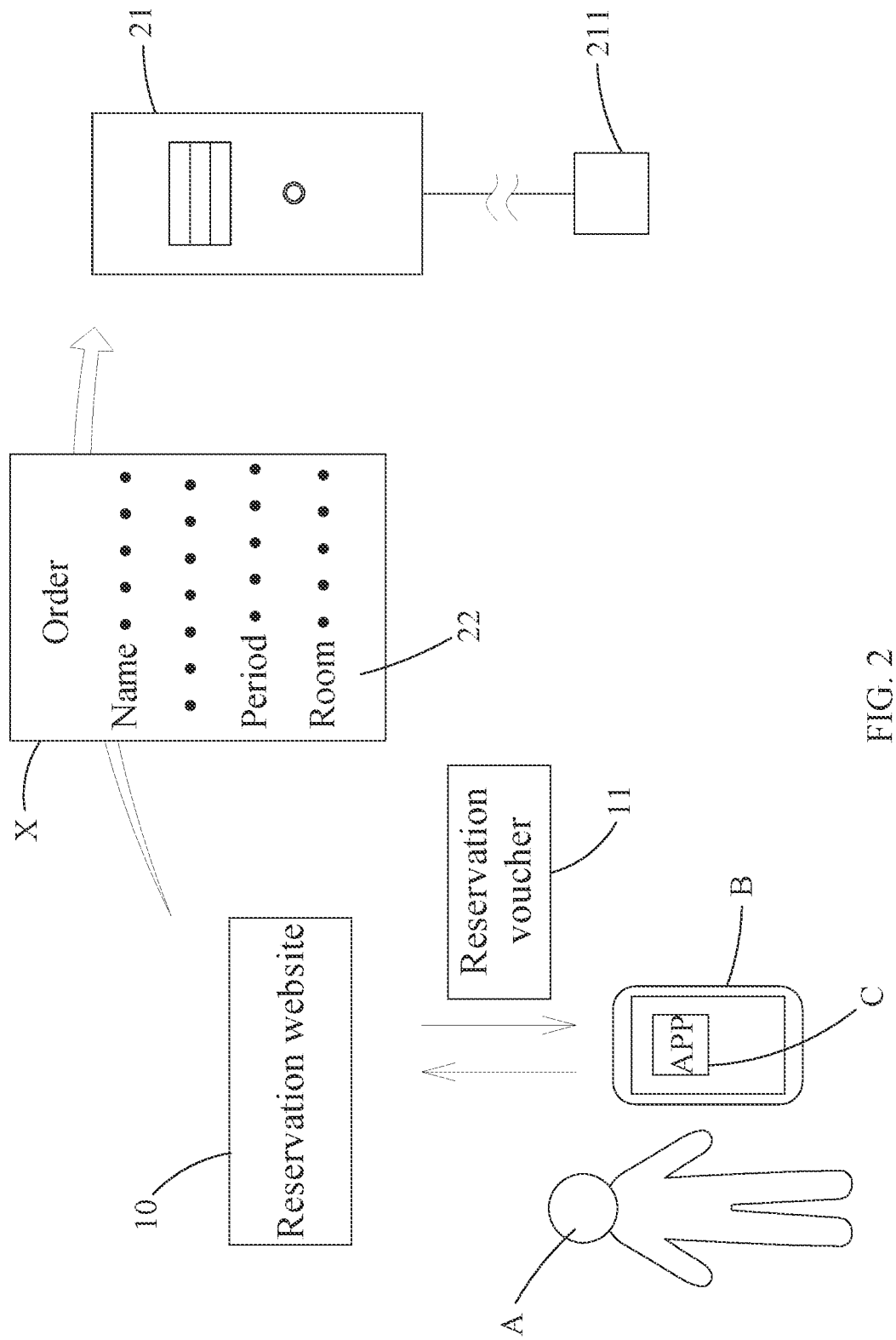
FIG. 2 is an implementation diagram of a preferred embodiment of the system in accordance with the present invention.
Figure 3:
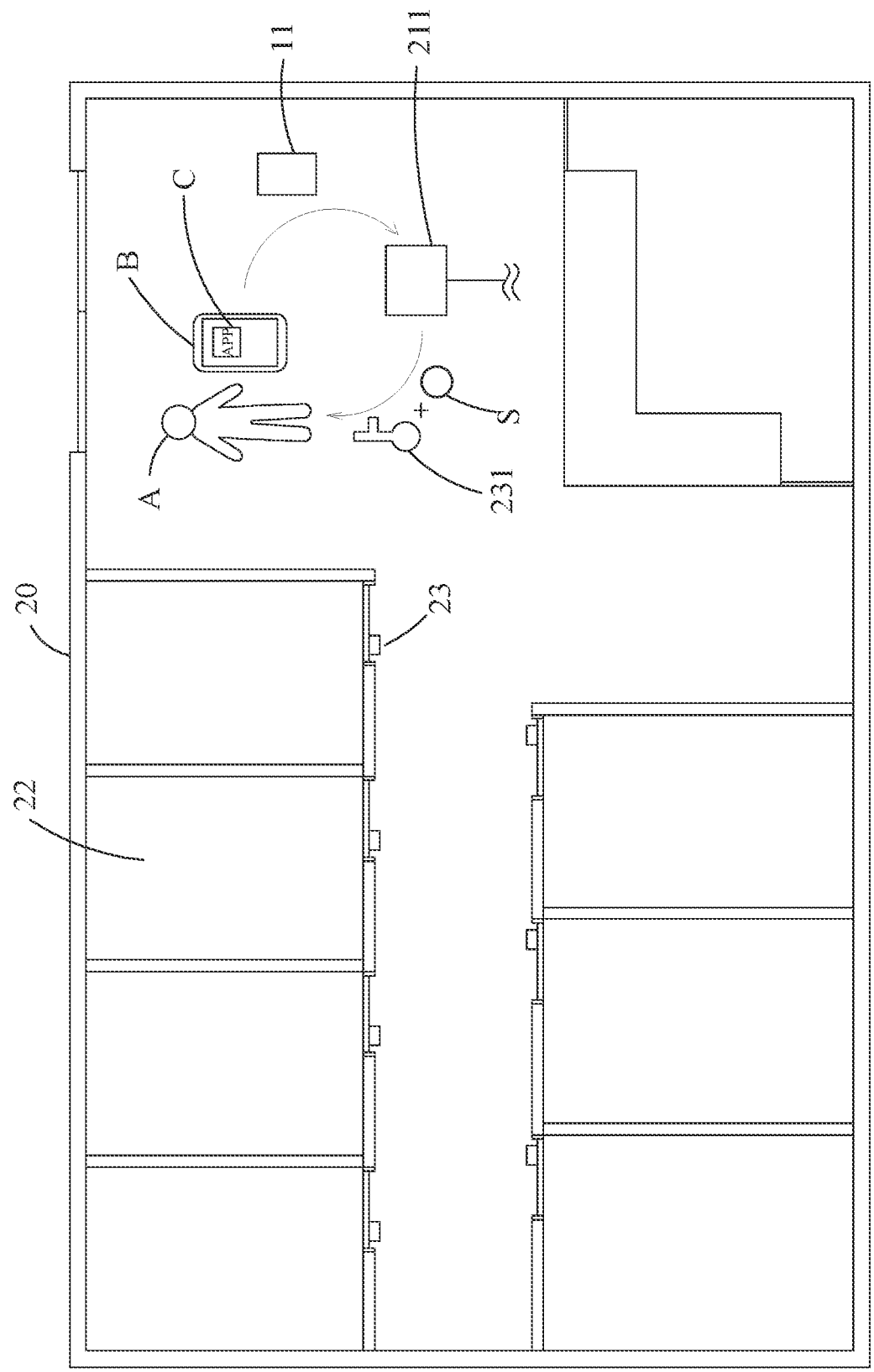
FIG. 3 is a simulation scenario schematic diagram of a preferred embodiment of the system in accordance with the present invention.

With reference to FIG. 1 to FIG. 3, a system of issuing a wireless key for reservation is provided. After a user A books a room on the internet, the system relates to check-in and exchange an electronic key 231 through a wireless sensing or transmission technology in a hotel 20, The system comprises a reservation website 10 set though a server. The reservation website 10 is connected with a hotel server 21 of the hotel 20 through the internet and exchange an information to each other.

The user A can use a mobile device B to connect or login the reservation website 10. The form of the mobile device B is not limited, the mobile device B can be a mobile phone or a mobile computer. The connection way of mobile device B and the reservation website 10 is also not limited, it may be using the mobile computer to browse the web-form-like reservation website 10 or using the mobile phone which downloaded a reservation app C that connects to the reservation website 10.

Further, since the information exchange between the reservation website 10 and the reservation app C. When the user A executes the reservation app C to connect the reservation website 10, the reservation website 10 shows one of rooms 22 in the hotel 20, and the room 22 can accept a reservation. Therefore, the user A can book one of the rooms 22 of the hotel 20 on the reservation website 10.

After the user A finishes the reservation of the room 22 on the reservation website 10, a reservation voucher 11, comprising a booking information of the user A, is formed by the server of the reservation website 10. The reservation voucher 11 is then sent to the mobile device B and is preserved in the reservation app C. Wherein the booking information can be a coding that the user A can be verified by the coding of the reservation voucher 11 when check-in. Moreover, the reservation voucher 11 may be a list comprising a user name, a period of the reservation, a number/code of the room 22, a notice, and a customer service contact method that the user A can learn the information related to the hotel 20 on the reservation voucher 11 directly.

On the other hand, an order X is formed by the server of the reservation website 10 and is sent to the hotel server 21 of the hotel 20. Wherein the order X comprises a check-in information required for the hotel 20 when check-in. The check-in information may comprise a user name, a user gender, a user birthday, a user address, a user contact method, a user ID number/passport number, a user payment information, the period of the reservation, or the number/code of the room 22 and other any detailed messages. Further, the order X may also comprise the booking information of the reservation voucher 11 that the booking information may help the hotel server 21 to verify the reservation voucher 11.

A lobby or other public spaces of the hotel 20 has an access point 211 connected to the hotel server 21 through wired/wireless signal connection. Each room 22 of the hotel 20 has an electronic lock 23 which corresponds to the room 22. Preferably, the access point 211 is a Bluetooth-router, and the access point 211 can detect the mobile device B which is downloaded/executed the reservation app C in a sensing range. The access point 211 can exchange the information with the mobile device B in the sensing range.

The present invention further provides an overall operation process of the system of issuing an electronic key for reservation on booking, verifying the reservation voucher 11, and exchanging the electronic key 231, comprising steps of:

(S01) Booking the room 22 on the reservation website 10.

The user A uses the mobile device B to execute the reservation app C, and then the mobile device B is connected to the reservation website 10. After the user A finish the reservation of the room 22, the reservation website 10 transmits the reservation voucher 11 and the order X to the reservation app C and the hotel server 21 simultaneously.

The hotel server 21 receives the order X which corresponds to the user A. The hotel server 21 verifies the room 22 and the period of the reservation by the check-in information of the order X, and confirms the identity of the user A and executes a check-in procedure through the check-in information such as the user's name, the user's gender, the user's birthday, the user's address, the user's contact method, the user's ID number/passport number, the user's payment information, and other details recorded on the order X.

Worthily to notice is that the system in accordance with the present invention completes the check-in procedure at the same time when the user A finishes the reservation of the room 22. Further, the room 22 displayed on the reservation website 10 can be performed by a room type that the hotel server 21 may not limit a specific one of the rooms 22 with the order X when doing the check-in procedure. Thus, the hotel server 21 can arrange the suitable room 22 according to the currently situation when the user A arrives the hotel 20.

(S02) Verifying the reservation voucher 11 and exchanging the electronic key 231.

The user A arrives the hotel 20 with carrying the mobile device B, and enters the lobby or other public spaces of the hotel 20 where the access point 211 is installed. When the user A enters the sensing range and operates the reservation app C, the mobile device B can be connected with the access point 211 wirelessly by executing the reservation app C to access the hotel server 21.

In the meantime, the hotel server 21 receives the connection of the user A though the access point 211 that enables the hotel server 21 and the reservation app C to exchange information and start the process of verifying reservation voucher 11. First, the hotel server 21 checks if the order X is valid from examining the booking information of the reservation voucher 11, that is, to check whether the user A has canceled the reservation on the reservation website 10. If the order X is valid, the hotel server 21 then issues the electronic key 231 according to the check-in information of the order X (such as the room 22 and the period of the reservation). The cancellation of the reservation will be described in detail in the following paragraphs.

With the exchange process of the access point 211 and the reservation app C, the hotel server 21 also sends a detecting software S to the reservation app C. Preferably, the detecting software S is packaged in the electronic key 231, so that the detecting software S can be transmitted to the reservation app C by with the electronic key 231. The purpose of the detecting software S is renewing the electronic lock 23 of the room 22, and the method for achieving to renew the electronic lock 23 will be described in detail in the following paragraphs.

The benefit for the user A with the process of verifying the reservation voucher 11 is that the hotel server 21 has already assisted the user A to complete the check-in procedure after the step (S01). The user A only needs to connect to the access point 211 via the reservation app C, the reservation app C and the access point 211 can automatically exchange the electronic key 231 corresponding to one of the rooms 22 by verifying the reservation voucher 11, then the electronic key 231 can be stored in to the reservation app C. With the step (S2), it can prevent the user A from checking-in, confirming the identity or other procedures at the front desk, completely save the time on check-in procedure, and overcome the problem of not being able to enter the room immediately.

The advantage of verifying the reservation voucher 11 for the hotel 20 and the hotel server 21 is that the hotel 20 only needs to verify the reservation voucher 11 but not re-confirm the identity information of the user A. The hotel 20 can directly transmit the electronic key 231 corresponding to the electronic lock 23 of the hotel room 22 to the user A after verifying the reservation voucher 11. Not only can help hotel 20 to make sure if the user A is arrived, but also can maintain the security with the method of issuing the electronic key 231 after verifying the reservation voucher 11.

(S03) Unlocking the room 22 and detecting the electronic lock 23.

After exchanging the electronic key 231, the user A then may move to the room 22 and open the room 22 by the reservation app C. The user A executes the reservation app C and uses the electronic key 231 to sense the electronic lock 23, then the room 22 can be unlocked. Also, the electronic lock 23 senses the detecting software S when sensing the electronic key 231. At the time of the detecting software S being sensed, the detecting software S starts to detect the function of the electronic lock 23. The detection of the detecting software S comprises confirming a level of the electronic lock 23, examining the function of each element installed in the electronic lock 23, or recording the activation efficiency of the electronic lock 23.

When the detecting software S finishes the process of detecting the electronic lock 23, a detecting result is formed and stored in the reservation app C. With every time the user A, carrying the mobile device B, crosses by the lobby or other public spaces of the hotel 20 and enters the sensing range of the access point 211, the reservation app C may exchange the information with the access point 211 and send the detecting result to the access point 211. Then, the access point 211 can further upload the detecting result to the hotel server 21, so that the hotel server 21 can evaluate or take some measures according to the detection result, such as notifying a hotel attendant for repairs. In this way, the hotel 20 can update or detect its peripheral devices while the user A unlocking the electronic lock 23, so the hotel 20 can be enabled to reduce labor costs effectively and achieve irregular monitoring.

The present invention further provides several preferred embodiments of the manner of the detecting software S detects the electronic lock 23 in the following paragraphs.

In one of embodiments, the detecting software S may be used to confirm the level of the electronic lock 23. The detecting software S can use a comparing code which is packaged with the detecting software S to compare a level code which is stored in the electronic lock 23, and to confirm whether the electronic lock 23 is upgraded to the latest level. No following action is required if the electronic lock 23 is at the latest level. On the contrary, if the electronic lock 23 is not met the latest level, the detecting software S can transmit an upgrade software through the reservation application C by wireless transmission that the electronic lock 23 can upgrade after loading.

In some embodiments, the detecting software S may be used to examine the function of each element installed in the electronic lock 23. The detecting software S can detect the function of each element through wireless sensing, such as battery power, a circuit transmission performance of a chip in the electronic lock 23, an efficiency of motor power in the electronic lock 23, or am attrition rate of a mechanical part such as a gear or a bolt in the electronic lock.

Preferably, the detecting software S may be used to record an actuating efficiency of the electronic lock 23. The detecting software S can record, through wireless sensing, an operation time from each time the electronic lock 23 sensing the electronic key 231 to the room 22 be unlocked or the number of times the electronic lock 23 failed to activate after sensing the electronic key 231.

The present invention further provides one of the preferred embodiments of the cancellation of the reservation. After the user A executes the reservation app C to cancel the reservation, the reservation website 10 informs the hotel server 21 that the order X has been cancelled, then the hotel server 21 may invalidate the order X. Thus, if the user A is still trying to exchange the electronic key 231 by the reservation voucher 11 after the reservation has been canceled. The hotel server 21 can use the reservation voucher 11 to confirm the state of the order X, and refuses to issue the electronic key 231 to the user A after the order X has been invalid.

Moreover, the mobile device B is not limited to download the reservation app C to achieve the procedures of booking the room 22 on the reservation website 10 or verifying the reservation voucher 11 and exchanging the electronic key 231 in the present invention. For example, after the user A completes the reservation on the reservation website 10, the reservation website 10 may send the reservation voucher 11 as a text message or email directly to the mobile device B to store. The mobile device B may use Bluetooth to exchange the electronic key 231 and detecting software S with the access point 211 directly when the user A arrives the hotel 20. Similarly, the detecting software S can be packaged together with the electronic key 231 as an encryption key or a barcode and be sensed from the electronic lock 23 when unlocking.

Further, when the user A bringing the mobile device B enters the sensing range, the hotel server 21 may transmit an ad-software to the mobile device B, the ad-software may be downloaded to the reservation app C or directly loading an application program related to the hotel 20 on the mobile device B. The purpose of the ad-software is to provides the user A with a hotel information related to the hotel 20.

In one of embodiments, the hotel information can be displayed in a pop-up advertisement in the reservation app C. The hotel information provides the user A with current activities, discounts or other information that should be noted about the hotel 20. Thus, the user A can obtain the hotel information when exchanging the electronic key 231, and help the hotel 20 to promote the hotel information.

Preferably, after the reservation app C downloading the ad-software, the hotel information may be formed as a picture, a background or a page and stored in the reservation app C. The reservation app C can be changed or be designed in various forms according to different requirements of the hotel server 21 and can help the reservation app C to be more customized.

Furthermore, the ad-software may be time-limited or network-domain limited, thus the ad-software can have time or regional restrictions when a related-event the hotel launching. For example, downloading of the ad-software is limited in the domain of the hotel server 21, and the reservation app C or the mobile device B cannot show or download the ad-software when the user A is not at a location of the hotel.

Moreover, the hotel server 21 constantly monitors the electronic key 231 according to the check-in information of the order X to ensure the period of the reservation of the user A. For example, at each time the user A enters the sensing range, the hotel server 21 repeatedly confirms whether the order X is exceeds the period of the reservation through the information exchanging from the wireless access point 211 with the application C. If the order X is already invalided, exceeding the period of the reservation, the hotel server 21 then cancels the electronic key 231 issued to the user A and helps the user A to process the check-out procedure. Avoiding that the user A still holds the electronic key 231 when the period of the reservation is exceeded, and consolidating the security and privacy of the hotel 20.

If the user A wants to check-out or change the room 22, the user A can go to the counter or execute the reservation application C to make a request directly. The invention further using the user A executes the reservation application C as the example. When the user A wants to check-out, the reservation application C transmits the check-out request the user A requests to the hotel server 21, and the hotel server 21 further cancels the order X and the electronic key 231 according to the check-out request. Similarly, when the user A wants to change the room 22, the reservation application C transmits a room-changing requested by the user A to the hotel server 21, and the hotel server 21 further re-arranges the order X, issues a new electronic key 231 corresponding to the other room 22, and cancels the original electronic key 231.

The present invention further provides a novel usage developed by the system of issuing a wireless key for reservation. It should be noted that when the step of verifying the reservation voucher 11 and exchanging the electronic key 231 (S02), the hotel server 21 checks the validity of the order X by using the reservation voucher 11, rather than identifying the identity of the user A. Thus, after the user A finishes the step of booking the room 22 (S01) and get the reservation voucher 11, the user A may further pass the room reservation voucher 11 to the other user A through the room reservation application C or the mobile device B. Then, the other user A can get the electronic key 321 from the hotel 20 by the reservation voucher 11 without identifying the personal information. The novel usage of the present invention can generate a service as a booking agent while maintaining the security for the hotel 20.

Further, if the user A passes the room reservation voucher 11 to the mobile device B of the other user A but the mobile device B does not download the reservation app C. The mobile device B of the other user A may download the reservation app C automatically after the other user A receives or clicks the reservation app C, so that the other user A can connect or login the reservation website 10/the reservation app C to use.

What is claimed is:

1. A system of issuing a wireless key for reservation of a room in a hotel, the system comprising:
   a reservation website showing at least one room or a room type which is allowed to be accepted as a reservation in the hotel;
   a hotel server settled with the reservation website, the hotel server connected to and exchanging information with the reservation website through the internet;
   an access point of the hotel connected to the hotel server through a signal connection;
   an electronic lock corresponding to the room;
   a mobile device connected with the reservation website through the internet, wherein the mobile device submits the reservation on the reservation website;
   a reservation voucher and an order are formed by the reservation website after the reservation website receives the reservation, wherein the reservation website has a capability of sending the reservation voucher to the mobile device, and sending the order to the hotel server of the hotel, the hotel server has a capability of executing a check-in procedure after receiving the order, the mobile device has a capability of sending the reservation voucher to the hotel server though the access point when the mobile device is entered into a sensing range of the access point, and
   an electronic key and a detecting software are issued to the mobile device through the access point after the reservation voucher is confirmed by the hotel server, wherein the electronic key is applied to unlock the electronic lock corresponding to the room, and the detecting software is applied to detect and upgrade a software of the electronic lock,
   wherein the detecting software is sensed by the electronic lock through a wireless signal connection, and has a capability of upgrading a level of the electronic lock after confirming the level of the electronic lock;
   wherein a detecting result is formed and stored in the mobile device after the detecting software detected and upgraded the software of the electronic lock; and
   wherein the mobile device has a capability of sending the detecting result to the hotel server though the access point when the mobile device is entered into the sensing range.

2. The system of issuing a wireless key for reservation as claimed in claim 1, wherein an ad-software is transmitted to the mobile device through the access point, the ad-software downloads an application program related to the hotel on the mobile device and provides a hotel information related to the hotel to the mobile device.

3. The system of issuing a wireless key for reservation as claimed in claim 2, wherein the access point is a Bluetooth-router; and the mobile device has a capability of downloading a reservation app which is connected to the reservation website, the reservation voucher, the electronic key, and the detecting software are sent to the mobile device thought the reservation app, and the mobile device unlocks the electronic lock through a wireless signal connection.

4. The system of issuing a wireless key for reservation as claimed in claim 2, wherein the detecting software is packaged in the electronic key.

5. The system of issuing a wireless key for reservation as claimed in claim 1, wherein the access point is a Bluetooth-router; and the mobile device has a capability of downloading a reservation app which is connected to the reservation website, the reservation voucher, the electronic key, and the detecting software are sent to the mobile device thought the reservation app, and the mobile device unlocks the electronic lock through a wireless signal connection.

6. The system of issuing a wireless key for reservation as claimed in claim 1, wherein the detecting software is packaged in the electronic key.

7. A system of issuing a wireless key for reservation for a room at a hotel, the system comprising:
   a hotel server connected to and exchanging information with a reservation website through the internet, the hotel server providing at least one room or a room type which is allowed to accept a reservation in the hotel on the reservation website, wherein the hotel server has a capability of executing a check-in procedure after receiving an order from the reservation website;
   an access point installed in the hotel and connected to the hotel server through a signal connection, the access point has a capability of sensing a mobile device in a sensing range, wherein the access point receives a reservation voucher which is stored in the mobile device after the reservation is completed and the access point sends the reservation voucher to the hotel server;
   an electronic lock corresponding to one room; and
   an electronic key and a detecting software are issued to the mobile device thought through the access point after the reservation voucher is confirmed by the hotel server, wherein the electronic key is applied to unlock one of the electronic lock, and the detecting software is applied to detect and upgrade a software of the electronic lock,
   wherein the detecting software is sensed by the electronic lock through a wireless signal connection, the detecting software has a capability of upgrading a level of the electronic lock after confirming the level of the electronic lock;

wherein a detecting result is formed and stored in the mobile device after the detecting software detected and upgraded the software of the electronic lock; and the mobile device has a capability of sending the detecting result to the hotel server through the access point when the mobile device is entered into the sensing range.

8. The system of issuing a wireless key for reservation as claimed in claim 7, wherein an ad-software is transmitted to the mobile device though through the access point, the ad-software downloads an application program related to the hotel on the mobile device and provides a hotel information related to the hotel to the mobile device.

9. The system of issuing a wireless key for reservation as claimed in claim 8, wherein the access point is a Bluetooth-router; and the mobile device has a capability of downloading a reservation app which is connected to the reservation website, the reservation voucher, the electronic key, and the detecting software are sent to the mobile device through the reservation app, and the mobile device unlocks the electronic lock through wireless signal connection.

10. The system of issuing a wireless key for reservation as claimed in claim 7, wherein the access point is a Bluetooth-router; and the mobile device has a capability of downloading a reservation app which is connected to the reservation website, the reservation voucher, the electronic key, and the detecting software are sent to the mobile device through the reservation app, and the mobile device unlocks the electronic lock through wireless signal connection.

* * * * *